(12) United States Patent
Nakamura

(10) Patent No.: US 8,678,446 B2
(45) Date of Patent: Mar. 25, 2014

(54) TUBULAR-MEMBER MOUNTING DEVICE

(75) Inventor: Hiroshi Nakamura, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/368,554

(22) Filed: Feb. 8, 2012

(65) Prior Publication Data

US 2012/0248763 A1      Oct. 4, 2012

(30) Foreign Application Priority Data

Mar. 28, 2011  (JP) .................................. 2011-069487

(51) Int. Cl.
*F16L 37/00*   (2006.01)

(52) U.S. Cl.
USPC .......................................................... 285/305

(58) Field of Classification Search
USPC .......................................................... 285/305
See application file for complete search history.

(56) References Cited

U.S. PATENT DOCUMENTS

| | | | | |
|---|---|---|---|---|
| 1,019,000 A | * | 2/1912 | Watson | 285/305 |
| 3,512,808 A | * | 5/1970 | Graham | 285/305 |
| 3,560,027 A | * | 2/1971 | Graham | 285/305 |
| 4,293,148 A | * | 10/1981 | Milberger | 285/305 |
| 5,909,725 A | * | 6/1999 | Balsdon et al. | 285/305 |
| 6,308,995 B1 | * | 10/2001 | Simson | 285/305 |
| 6,341,736 B1 | * | 1/2002 | Liao | 285/305 |
| 6,530,606 B2 | * | 3/2003 | Lehner | 285/305 |
| 6,682,100 B2 | * | 1/2004 | Wood et al. | 285/305 |
| 6,808,211 B2 | * | 10/2004 | Hofmann et al. | 285/305 |
| 7,401,820 B2 | * | 7/2008 | Niki | 285/305 |
| 7,481,463 B2 | * | 1/2009 | Ishida et al. | 285/305 |
| 7,938,455 B2 | * | 5/2011 | Rapp | 285/305 |
| 8,070,188 B2 | * | 12/2011 | Cronley | 285/305 |
| 8,087,702 B2 | * | 1/2012 | Schmidt | 285/305 |
| 8,292,333 B2 | * | 10/2012 | Ogawa et al. | 285/305 |

FOREIGN PATENT DOCUMENTS

JP            2943722         6/1999

* cited by examiner

*Primary Examiner* — David E Bochna

(57) ABSTRACT

A tubular member has one end inserted in a fluid passage of a passage member through an insertion hole. The tubular member includes a large diameter portion and a small diameter portion therebetween having a step defining an inclined portion. The inclined portion is inclined from the radially outside toward the radially inside. A lock member is held by a holding portion located outside the insertion hole relative to the radial direction of the insertion hole. The lock member urges the inclined portion radially inward and applies force to the inclined portion in the axial direction to cause the outer surface of the tubular member to urge a regulating portion to cause the regulating portion to restrict movement of the tubular member in the axial direction.

4 Claims, 9 Drawing Sheets

TUBULAR-MEMBER MOUNTING DEVICE

CROSS REFERENCE TO RELATED APPLICATIONS

This application is based on Japanese Patent Application No. 2011-69487 filed on Mar. 28, 2011, the contents of which are incorporated in their entirely herein by reference.

TECHNICAL FIELD

The present invention relates to a tubular-member mounting device configured to mount a tubular member, such as a fuel property sensor or a fuel pipe, to an insertion hole formed in a passage member having a fluid passage.

BACKGROUND

A conventionally-known fuel property sensor is equipped in a fueling system, which is for supplying fuel to an internal combustion engine, and configured to detect a fuel property, such as alcohol concentration, fuel pressure, or oxidation state of fuel. The fuel property sensor is mounted to, for example, a flange, which covers an opening of a fuel tank. The flange has a fluid passage to flow fuel discharged from a fuel pump equipped in the fuel tank. The flange has an insertion hole, which communicates the fluid passage with an external-air side of the flange. The fuel property sensor has a tubular sensor portion mounted to the fluid passage through the insertion hole.

For example, a Patent document 1 (Publication of Japanese Patent 2943722) discloses a configuration in which the tubular fuel pipe (joint 12 in the Patent document 1) is mounted to the insertion hole (opening 14 in the Patent document 1) of the flange (cap 10 in the Patent document 1). In the Patent document 1, the fuel pipe has a stopper portion 38 being in an annular shape and projected radially outward from the outer wall of the fuel pipe. In the Patent document 1, the stopper portion 38 is mounted on the surface of the flange defining the end of the insertion hole on the external-air side. Thereafter, a U-shaped clip 44 is mounted to the fuel pipe on the opposite side of the fluid passage through the stopper portion 38. The clip 44 is held by a clip holding portion 16 formed on the flange and located on the radially outside of the insertion hole. In this way, the stopper portion 38 is sandwiched between the end surface of the flange and the clip 44 thereby to affix the fuel pipe to the insertion hole of the flange.

It is noted that, in the configuration of the Patent document 1, slight gaps are formed respectively between the stopper portion 38 and the clip 44, and between the clip 44 and the clip holding portion 16, due to manufacturing tolerance. Accordingly, the fuel pipe may repeat minute vibration in the axial direction due to vibration of the vehicle. In general, the wall surface of the flange defining the insertion hole and the fuel pipe are sealed with an O-ring therebetween. Due to the above-described vibration of the fuel pipe, the O-ring and other components may cause ablation or deformation.

SUMMARY

In view of the foregoing and other problems, it is an object of the present invention to produce a tubular-member mounting device configured to mount a tubular member steadily to an insertion hole of a passage member.

According to an aspect of the present invention, a tubular-member mounting device comprises a passage member having a fluid passage configured to flow fluid therethrough and an insertion hole configured to communicate the fluid passage with an external-air side of the passage member. The tubular-member mounting device further comprises a tubular member being in a tubular shape and having a large diameter portion and a small diameter portion, the small diameter portion being smaller than the large diameter portion in diameter, the tubular member having one end in an axial direction, the one end being inserted in the fluid passage through the insertion hole. The tubular-member mounting device further comprises an inclined portion located on a step between the large diameter portion and the small diameter portion and inclined from a radially outside toward a radially inside in the axial direction from the large diameter portion toward the small diameter portion. The tubular-member mounting device further comprises a lock member located on the external-air side of the passage member to urge the inclined portion radially inward. The tubular-member mounting device further comprises a holding portion located on an outer wall of the passage member and located at a radially outside of the insertion hole to hold the lock member. The tubular-member mounting device further comprises a contact portion located on an outer wall of the tubular member in the axial direction. The tubular-member mounting device further comprises a regulating portion urged from the contact portion and configured to regulate movement of the tubular member in the axial direction when the lock member urges the inclined portion radially inward thereby to apply a force to the inclined portion to move the tubular member toward the large diameter portion in the axial direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments will be described with reference to drawings.

First Embodiment

FIGS. 1 to 6 show a tubular-member mounting device according to the first embodiment. In the present embodiment, the tubular-member mounting device is applied to a fuel property sensor 1. Specifically, the fuel property sensor 1 is a concentration sensor equipped in a fueling system of a vehicle for detecting the concentration (ethanol concentration) of ethanol contained in fuel. The ethanol concentration detected by the fuel property sensor 1 is transmitted to an electronic control unit (ECU) of an internal combustion engine (not shown). The ECU controls a fuel injection quantity, an ignition timing, and the like according to the ethanol concentration. Thus, the ECU properly controls the air-fuel ratio of the internal combustion engine thereby to enhance drivability of the vehicle. In addition, the control enables reduction in toxic substance contained in exhaust gas.

Figure 1:
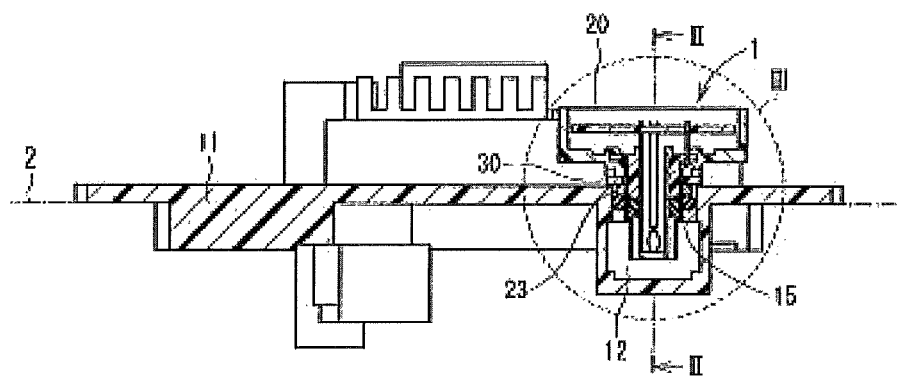
FIG. 1 is a sectional view showing a tubular-member mounting device according to the first embodiment.
Figure 2:
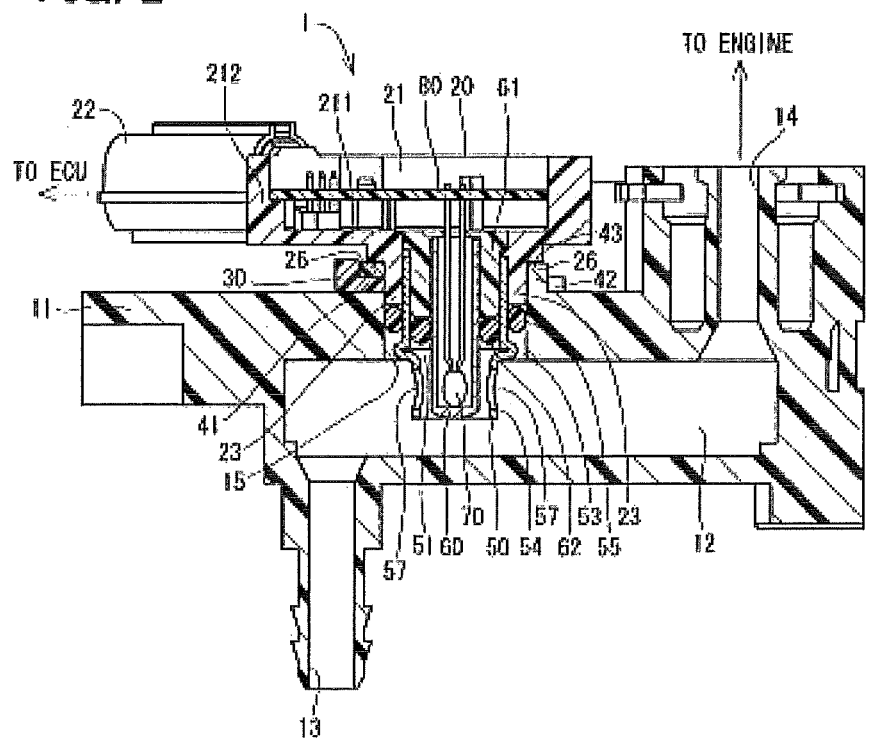
FIG. 2 is a sectional view taken along a line II-II in FIG. 1.
Figure 3:
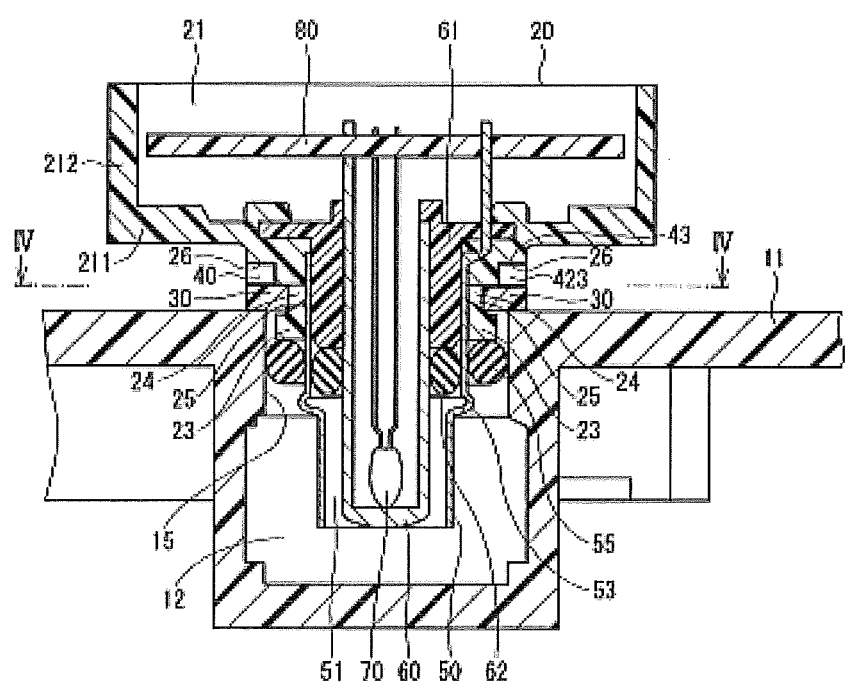
FIG. 3 is an enlarged view showing a portion of the tubular-member mounting device represented by the circle III in FIG. 1.

As shown in FIGS. 1 to 3, the fuel property sensor 1 is mounted to a flange 11 being a passage member. The flange 11 covers an opening of a fuel tank 2. The flange 11 is substantially in a disc-shape and has a fluid passage 12 therein. The fluid passage 12 is bent in a crank shape. One end 13 of the fluid passage 12 extends into the fuel tank 2. The one end 13 of the fluid passage 12 is connected with a bellows tube (not shown). A fuel pump (not shown) is equipped in the fuel tank 2 to discharge fuel through the bellows tube into the fluid passage 12. The other end 14 of the fluid passage 12 is connected with a fuel pipe (not shown) for supplying fuel to an internal combustion engine (not shown). Fuel flowing through the fluid passage 12 is supplied to the internal combustion engine through the fuel pipe. The one end 13 of the fluid passage 12 and the other end 14 of the fluid passage 12 therebetween have a passage extending along the flange 11. The passage of the fluid passage 12 has an insertion hole 15 communicating the fluid passage 12 with an external-air side of the flange 11. The insertion hole 15 is substantially perpendicular to the fluid passage 12. The fuel property sensor 1 has a sensor portion inserted through the insertion hole 15 into the fluid passage 12.

The fuel property sensor 1 includes a housing 20, an external electrode 50, an internal electrode 60, a thermistor 70, a circuit board 80, and/or the like. The housing 20 is formed of, for example, a resin material to include a circuit-board accommodating portion 21, a connector 22, and a tubular portion 23. The circuit-board accommodating portion 21 is formed in a bottomed tubular shape to include a bottom portion 211 and a side portion 212. The circuit board 80 having a detection circuit is affixed to the inside of the circuit-board accommodating portion 21 with a faster such as a screw. The side portion 212 of the circuit-board accommodating portion 21 is equipped with the connector 22. The connector 22 has a terminal electrically coupled with the ECU. The tubular portion 23 is substantially in a tubular shape and extending from the bottom portion 211 of the circuit-board accommodating portion 21 toward the fluid passage 12.

The external electrode 50 is formed of a metal plate such as a stainless steel plate by press working to be substantially in a cylindrical shape. The external electrode 50 is electrically coupled with the circuit board 80. The external electrode 50 is resin-molded on the radially inside of the tubular portion 23 of the housing 20. The tubular portion 23 of the housing 20 has two recessed grooves 24 dented radially inward at two positions in the tubular portion 23 in the circumferential direction. The recessed grooves 24 are arranged symmetrically in the radial direction across the axis of the tubular portion 23. The recessed grooves 24 are opened radially inward toward the external electrode 50. The outer wall of the external electrode 50 is exposed through the recessed grooves 24.

In the present embodiment, the housing 20, the external electrode 50, and the internal electrode 60 are equivalent to a tubular member. In the present embodiment, the external electrode 50 located radially inside of the recessed groove 24 is equivalent to a small diameter portion, and the tubular portion 23 located closer to the fluid passage 12 than the recessed grooves 24 is equivalent to a large diameter portion. Each of the recessed grooves 24 on the side of the fluid passage 12 in the axial direction is defined by an inclined portion 25 formed on the wall of the tubular portion 23. The inclined portion 25 is inclined from the radially outside toward the radially inside in the axial direction from the fluid passage 12 toward the circuit-board accommodating portion 21. The inclined portion 25 is formed on the wall surface of the tubular portion 23 to define each of the recessed grooves 24 on the side of the fluid passage 12 in the axial direction. The inclined portion 25 is in a tapered shape and extends continually in the circumferential direction.

Figure 4:
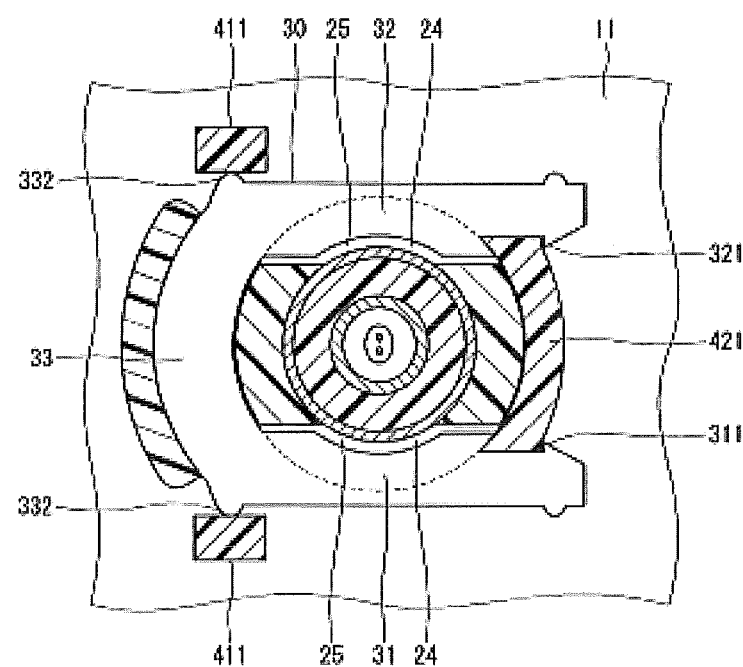
FIG. 4 is a sectional view taken along a line IV-IV in FIG. 3.
Figure 5:
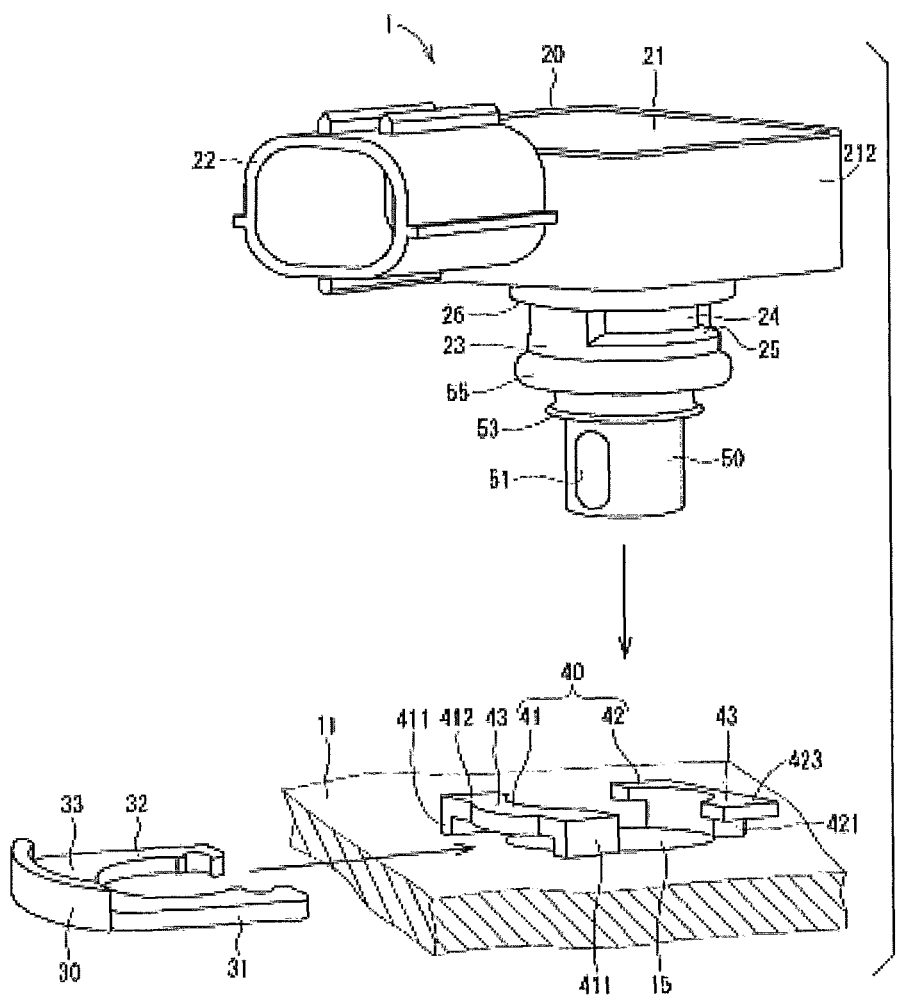
FIG. 5 is an explanatory view showing an assembling method of the tubular-member mounting device according to the first embodiment.

As shown in FIGS. 4 and 5, a clip 30 is substantially in a U-shape lock member and includes two arm portions 31 and 32 and a joint portion 33. The two arm portions 31 and 32 extend substantially in parallel to each other. The joint portion 33 connects ends of the two arm portions 31 and 32 with each other. In the clip 30, the distance between the two arm portions 31 and 32 increases as being away from the joint portion 33 functioning as a fulcrum. The clip 30 is elastically deformable to restore its original shape after being deformed. With the present configuration, the two arm portions 31 and 32 of the clip 30 are configured to be fitted respectively to the recessed grooves 24. Thus, the two arm portions 31 and 32 bias the inclined portions 25 radially inward at the symmetrical positions in the radial direction across the axis of the tubular portion 23. The outer wall of the flange 11 on the side of the circuit-board accommodating portion 21 is equipped with a clip holding portion 40 being a holding portion. The clip holding portion 40 is located radially outside of the insertion hole 15. The clip holding portion 40 includes a first clip holding portion 41 and a second clip holding portion 42. The first clip holding portion 41 holds the joint portion 33 of the clip 30. The second clip holding portion 42 holds ends of the two arm portions 31 and 32 of the clip 30 on the opposite side from the joint portion 33.

The first clip holding portion 41 is substantially in a gate shape and has two pillars 411 and a first top plate 412. The two pillars 411 extend from the flange 11 toward the circuit-board accommodating portion 21. The first top plate 412 connects the ends of the two pillars 411 on the side of the circuit-board accommodating portion 21. The second clip holding portion 42 is substantially in a T-shape and has a pillar 421 and a second top plate 423. The pillar 421 extends from the flange 11 toward the circuit-board accommodating portion 21. The second top plate 423 is located on the end of the pillar 421 on the side of the circuit-board accommodating portion 21. The second top plate 423 is larger than the pillar 421 in the radial direction. The distance between the first top plate 412 and the flange 11 is slightly greater than the thickness of the clip 30. The distance between the second top plate 423 and the flange 11 is also slightly greater than the thickness of the clip 30. The clip 30 is inserted into both the clearance between the first top plate 412 and the flange 11 and the clearance between the second top plate 423 and the flange 11. In the insertion, the inner walls of the two pillars 411 respectively guide projections 332 formed on both radially outer ends of the joint portion 33 of the clip 30. Further, claws 311 and 321 formed on the arm portions 31 and 32 of the clip 30 are held by the outer wall of the pillar 421.

Referring to FIGS. 3 to 5, the circuit-board accommodating portion 21 has the bottom portion 211. A contact portion 26 being in a tubular shape extends from the bottom portion 211 toward the first and second clip holding portions 41 and 42. The first top plate 412 of the first clip holding portion 41 and the second top plate 423 of the second clip holding portion 42 are in contact with the contact portion 26. The outer walls of the first top plate 412 and the second top plate 423 on the side of the circuit-board accommodating portion 21 are regulating portion 43 being in contact with the contact portion 26 of the housing 20.

Referring to FIGS. 2 and 3, an outer seal member 55 is equipped between the inner wall of the flange 11 defining the insertion hole 15 and the external electrode 50. The outer seal member 55 is, for example, an O-ring. The outer seal member 55 avoids leakage of fuel through the gap between the insertion hole 15 and the external electrode 50. The external electrode 50 has an annular portion 53 located closer to the fluid passage 12 than the outer seal member 55 in the axial direction. The annular portion 53 is substantially in an annular shape and projects radially outward. The annular portion 53 avoids detachment of the outer seal member 55. The external electrode 50 has a lower portion on the opposite side from the housing 20, and the lower portion extends into the fluid passage 12. The external electrode 50 has an inserted portion inserted into the fluid passage 12, and the inserted portion defines a fuel chamber 51 radially therein. The external electrode 50 has two communication holes 57 on the lower side of the annular portion 53. The two communication holes 57 communicate the fluid passage 12 with the fuel chamber 51. The two communication holes 57 are substantially axisymmetric with each other and arranged along the direction in which fuel flows through the fluid passage 12. The present configuration enables fuel in the fluid passage 12 to pass through one communication hole 57, the fuel chamber 51, and the other communication hole 57.

The internal electrode 60 is a bottomed tubular member formed of a metallic material such as stainless steel. A holder 61 is substantially in a tubular shape and formed of resin. The internal electrode 60 is resin-molded on the radially inside of the holder 61. The internal electrode 60 is electrically connected with the circuit board 80. The holder 61 is inserted in the external electrode 50 and secured by crimping, welding, or the like to the bottom portion 211 of the housing 20 and the tubular portion 23. The internal electrode 60 is located in the fuel chamber 51 defined in the external electrode 50 and substantially coaxial with the external electrode 50. In the present configuration, the external electrode 50 and the internal electrode 60 function as a capacitor with fuel as a dielectric material therebetween. An inner seal member 62 is equipped between the external electrode 50 and the internal electrode 60. The inner seal member 62 is an annular member such as an O-ring. The inner seal member 62 avoids leakage of fuel through the gap between the external electrode 50 and the internal electrode 60 into the circuit-board accommodating portion 21 of the housing 20.

The thermistor 70 is a temperature detection unit accommodated radially inside of the internal electrode 60. The thermistor 70 is electrically coupled with the circuit board 80. A thermal conduction material (not shown), such as a silicone material, is charged in the internal electrode 60. In the present configuration, temperature of fuel in the fuel chamber 51 is transmitted to the thermistor 70 through the outer wall of the internal electrode 60 and the thermal conduction material.

The circuit board 80 is electrically coupled with the external electrode 50, the internal electrode 60, and the thermistor 70. An encapsulation material (not shown) is charged on the circuit board 80. The detection circuit on the circuit board 80 implements charge and discharge of electricity between the external electrode 50 and the internal electrode 60 thereby to detect the capacitance between the external electrode 50 and the internal electrode 60. The detection circuit further detects the temperature of fuel in the fuel chamber 51 by using the thermistor 70. The detected capacitance varies in response to variation in the dielectric constant of fuel. The dielectric constant varies in response to the mixture ratio of ethanol to gasoline in fuel and the fuel temperature. Therefore, the detection circuit can detect the ethanol concentration of fuel in the fuel chamber 51 according to the capacitance between the electrodes and the fuel temperature. The ethanol concentration detected by the detection circuit is transmitted to the ECU through the terminal of the connector 22. The ECU controls the fuel injection quantity, the ignition timing, and the like, according to the ethanol concentration thereby to appropriately control the air-fuel ratio of the internal combustion engine.

As follows, a method for mounting the fuel property sensor 1 to the flange 11 will be described with reference to FIGS. 5 and 6. First, the tubular portion 23 of the housing 20, the external electrode 50, and the internal electrode 60 of the fuel property sensor 1 are inserted into the insertion hole 15 of the flange 11. By the insertion, the contact portion 26 of the housing 20 makes contact with the regulating portion 43 of the clip holding portion 40. Subsequently, the clip 30 is inserted into the clip holding portion 40. Thereby, the clip 30 is fitted to the recessed grooves 24 of the tubular portion 23. In the present configuration, the recessed grooves 24 are defined by the inclined portions 25 on the side of the fluid passage 12 in the axial direction. The inclined portions 25 are configured to reduce the gaps between the clip 30 and the wall surfaces of the tubular portion 23 defining the recessed grooves 24 in the axial direction. The two arm portions 31 and 32 of the clip 30 cause resilience radially inward to urge the inclined portions 25 defining the recessed grooves 24.

Figure 6:
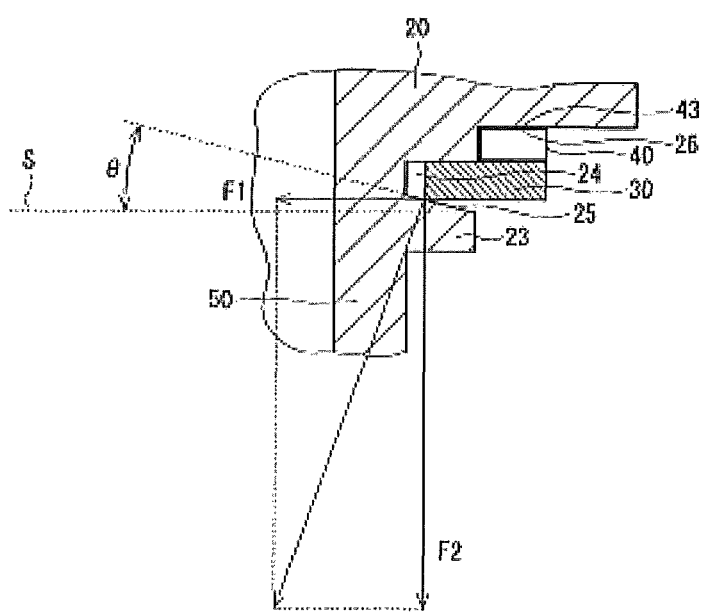
FIG. 6 is an explanatory view showing force working on an inclined portion of the tubular-member mounting device according to the first embodiment.

As shown in FIG. 6, when the clip 30 urges the inclined portions 25 radially inward, force works on the inclined portions 25 to move the tubular portion 23 toward the fluid passage 12. In the present state, the clip 30 receives counter force from the inclined portions 25. The counter force causes the end surface of the clip 30 on the side of the circuit-board accommodating portion 21 to keep in contact with the end surface of the first and second top plates 412 and 423 of the clip holding portion 40 on the side of the fluid passage 12 in the axial direction. Specifically, the clip 30 applies force F1 to urge the inclined portion 25 radially inward and applies force F2 to move the tubular portion 23 toward the fluid passage 12. The inclined portion 25 is at an angle θ relative to a virtual plane S, which is perpendicular to the axis of the tubular portion 23.

The relation of these values is represented by $F2=F1/\tan \theta$. That is, the force F1 applied radially inward from the clip 30 to the inclined portion 25 causes the force F2 increased by wedge effect to move the fuel property sensor 1 toward the fluid passage 12. In order to cause the force F1 to produce the increased force F2, the angle θ between the inclined portion 25 and the virtual plane S is set to satisfy $0<\theta<45(°)$. That is, the increasing rate of the force F2 relative to the force F1 can be enhanced by setting the angle θ to satisfy $\theta<45(°)$. In addition, the clip 30 is enabled to urge the inclined portion 25 steadily by setting the angle θ to satisfy $0<\theta(°)$. The angle θ may be effective in the range of $5<\theta<40(°)$ and may be further effective in the range of $10<\theta<35(°)$. The force F2 works on the inclined portion 25 to move the fuel property sensor 1 toward the fluid passage 12 thereby to urge the contact portion 26 of the housing 20 onto the regulating portion 43 of the clip holding portion 40. Thus, the present configuration regulates movement of the fuel property sensor 1 in the axial direction. In addition, the wall of the housing 20 on the opposite side from the inclined portion 25 in the axial direction across the recessed groove 24 restrains deformation of the clip 30 due to the counter force of the force F2 toward the circuit-board accommodating portion 21 in the axial direction.

The configuration of the present embodiment produces the following operation effects.

(1) In the present embodiment, the clip 30 is fitted to the recessed grooves 24 thereby to urge radially inward the inclined portions 25 defining the recessed grooves 24. The force radially inward applied from the clip 30 is increased to the force in the axial direction by the wedge effect to move the tubular portion 23 toward the large diameter portion in the axial direction. The contact portion 26 formed on the housing 20 is urged in this way onto the regulating portion 43 formed on the clip holding portion 40, thereby to regulate the movement of the tubular portion 23 in the axial direction. With the present configuration, the flange 11 and the fuel property sensor 1 can be restricted from causing minute movement due to, for example, vibration transmitted from the internal combustion engine and the like to the flange 11 or the fuel property sensor 1. Therefore, the outer seal member 55 equipped between the wall surface of the flange 11, which defines the insertion hole 15, and the tubular portion 23 can be restricted from causing abrasion or deformation. Therefore, leakage of fuel through the insertion hole 15 can be avoided. In addition, disconnection due to vibration can be avoided in a wiring component coupling the circuit board with the external electrode 50, a wiring component coupling the circuit board with the internal electrode 60, and/or a wiring component coupling the circuit board with the thermistor. Thus, vibration-proof property of the fuel property sensor 1 can be enhanced.

(2) In the present embodiment, the recessed grooves 24 are located respectively at the radially symmetric positions across the axis of the tubular portion 23. In addition, the inclined portions 25 are formed on the wall surface of the tubular portion 23 respectively to define the recessed grooves 24 on the side of the fluid passage 12 in the axial direction. Each of the inclined portions 25 is in a tapered shape and extends continually in the circumferential direction. With the present configuration, the force, which is applied from the two arm portions 31 and 32 of the clip 30 respectively to urge the inclined portions 25 radially inward, substantially works uniformly on the tubular portion 23. Therefore, the tubular portion 23 can be restricted from being inclined relative to the axis of the insertion hole 15. Thus, the contact portion 26 can be urged steadily onto the regulating portion 43. Therefore, the fuel property sensor 1 can be secured steadily to the insertion hole 15 of the flange 11.

Second Embodiment

Figure 7:
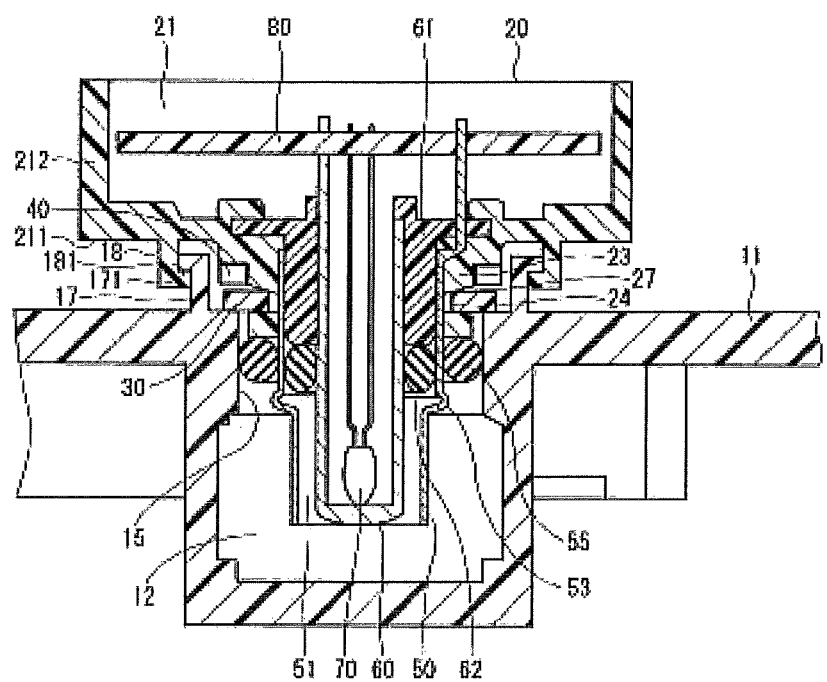
FIG. 7 is a sectional view showing the tubular-member mounting device according to the second embodiment.

The tubular-member mounting device according to the second embodiment will be described with reference to FIG. 7. As follows, the components substantially equivalent to those in the first embodiment will be denoted by the same reference numerals, and description thereof will be omitted. In the present embodiment, the recessed grooves 24 are defined by inclined portions 27 formed on the wall surface of the tubular portion 23 and located on the side of the circuit-board accommodating portion 21 in the axial direction. The inclined portions 27 are inclined from the radially outside toward the radially inside in the axial direction from the circuit-board accommodating portion 21 toward the fluid passage 12. In the present embodiment, the tubular portion 23 located closer to the circuit-board accommodating portion 21 than the recessed grooves 24 is equivalent to the large diameter portion.

In the present embodiment, a first fitting member 17 extends from the flange 11 toward the circuit-board accommodating portion 21. The first fitting member 17 has an end further extending radially outward. In addition, a second fitting member 18 extends from the circuit-board accommodating portion 21 toward the flange 11. The second fitting member 18 has an end extending radially inward. The end surface of the first fitting member 17 on the side of the flange 11 is in contact with the end surface of the second fitting member 18 on the side of the circuit-board accommodating portion 21. In the present embodiment, the end surface of the first fitting member 17 on the side of the flange 11 is equivalent to a regulating portion 171, and the end surface of the second fitting member 18 on the side of the circuit-board accommodating portion 21 is equivalent to a contact portion 181.

As follows, a method for mounting the fuel property sensor 1 to the flange 11 will be described. First, the tubular portion 23 of the housing 20, the external electrode 50, and the internal electrode 60 of the fuel property sensor 1 are inserted into the insertion hole 15 of the flange 11. Subsequently, the tubular portion 23 is rotated in the circumferential direction thereby to set the position of the regulating portion 171 of the first fitting member 17 to be opposed to the contact portion 181 of the second fitting member 18 in the axial direction.

Subsequently, the clip 30 is inserted into the clip holding portion 40 and fitted to the recessed grooves 24 of the tubular portion 23. When the clip 30 urges the inclined portions 27 radially inward, force works on the inclined portions 27 to move the tubular portion 23 toward the circuit-board accommodating portion 21. In the present state, the clip 30 receives the counter force from the inclined portions 27, and the counter force causes the end surface of the clip 30 on the side of the fluid passage 12 to keep in contact with the end surface of the flange 11 on the side of the circuit-board accommodating portion 21 in the axial direction.

The force works around an insertion hole 15 to move the tubular portion 23 toward the circuit-board accommodating portion 21 thereby to urge the contact portion 181 of the second fitting member 18 onto the regulating portion 171 of the first fitting member 17. Thus, the present configuration regulates movement of the fuel property sensor in the axial direction. The present embodiment also produces operation effects similar to those of the first embodiment.

Third Embodiment

Figure 8:
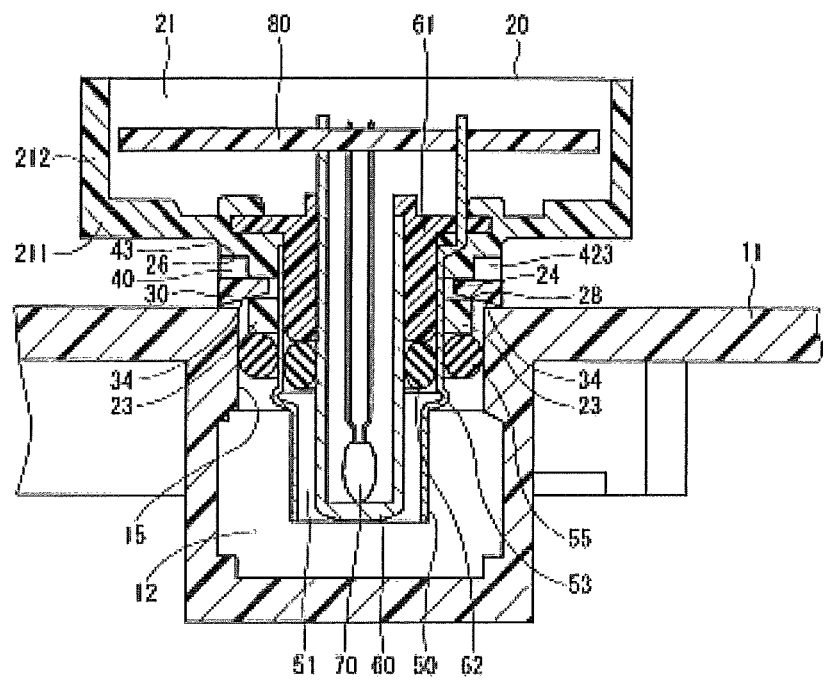
FIG. 8 is a sectional view showing the tubular-member mounting device according to the third embodiment.

The tubular-member mounting device according to the third embodiment will be described with reference to FIG. 8. In present embodiment, the inclined portions are not formed on the wall surface defining the recessed grooves 24 in the axial direction. Instead, second inclined portions 34 are formed on the outer wall surface of the clip 30 on the side of the fluid passage in the axial direction. The second inclined portions 34 are inclined from the radially outside toward the radially inside in the axial direction from the fluid passage 12 toward the circuit-board accommodating portion 21. In the present embodiment, the tubular portion 23 located closer to the fluid passage 12 than the recessed grooves 24 is equivalent to the large diameter portion.

Connecting portions 28 connect the wall surface of the tubular portion 23, which defines the recessed grooves 24 on the side of the fluid passage 12 in the axial direction, with the outer wall surface of the tubular portion 23, which is located closer to the fluid passage 12 than the recessed grooves 24. The second inclined portions 34 formed on the clip 30 urge the connecting portions 28 radially inward. With the present configuration, force works on the connecting portions 28, which define the recessed grooves 24, thereby to move the tubular portion 23 toward the fluid passage 12. In the present state, the clip 30 receives counter force from the connecting portions 28, which define the recessed grooves 24. The counter force causes the end surface of the clip 30 on the side of the circuit-board accommodating portion 21 to keep in contact with the end surfaces of the first and second top plates 412 and 423 of the clip holding portion 40 on the side of the fluid passage 12 in the axial direction.

The force works on the connecting portions 28, which define the recessed grooves 24, to move the tubular portion 23 toward the fluid passage 12 thereby to urge the contact portion 26 of the housing 20 on the side of the fluid passage onto the regulating portion 43 of the clip holding portion 40 in the axial direction. Thus, the present configuration regulates movement of the fuel property sensor in the axial direction. The present embodiment also produces operation effects similar to those of the first and second embodiments.

Fourth Embodiment

Figure 9:
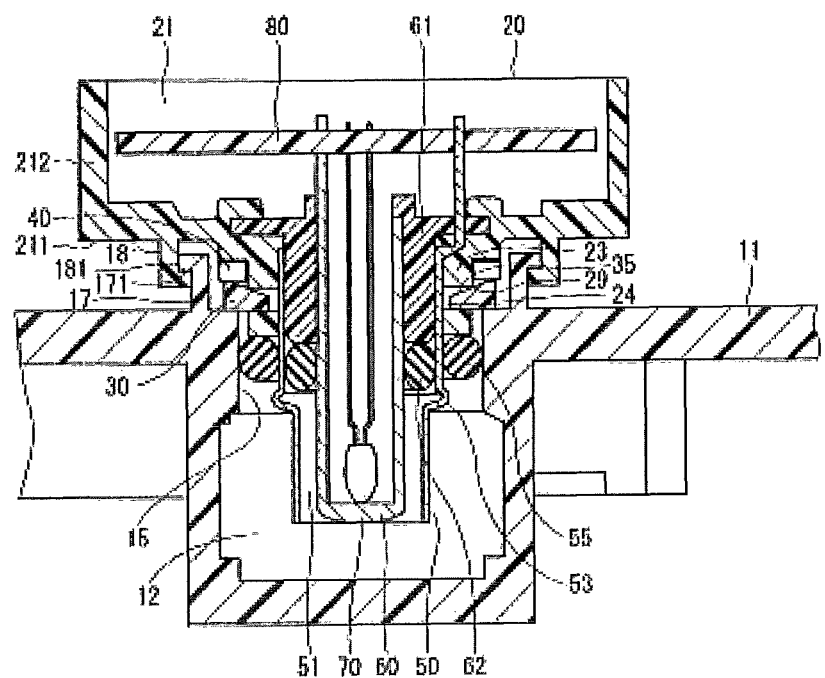
FIG. 9 is a sectional view showing the tubular-member mounting device according to the fourth embodiment.

The tubular-member mounting device according to the fourth embodiment will be described with reference to FIG. 9. In the present embodiment, second inclined portions 35 are formed on the outer wall surface of the clip 30 on the side of the circuit-board accommodating portion 21 in the axial direction. The second inclined portions 35 are inclined from the radially outside toward the radially inside in the axial direction from the circuit-board accommodating portion 21 toward the fluid passage 12. In the present embodiment, the tubular portion 23 located closer to the circuit-board accommodating portion 21 than the recessed groove 24 is equivalent to the large diameter portion.

Connecting portions 29 connect the wall surface of the tubular portion 23, which defines the recessed grooves 24 on the side of the circuit-board accommodating portion 21 in the axial direction, with the outer wall surface of the tubular portion 23, which is located closer to the circuit-board accommodating portion 21 than the recessed grooves 24. The second inclined portions 35 formed on the clip 30 urge the connecting portions 29 radially inward. With the present configuration, force works on the connecting portions 29, which define the recessed grooves 24, thereby to move the tubular portion 23 toward the circuit-board accommodating portion 21. In the present state, the clip 30 receives the counter force from the connecting portions 29, which define the recessed grooves 24, and the counter force causes the end surface of the clip 30 on the side of the fluid passage 12 to keep in contact with the end surface of the flange 11 on the side of the circuit-board accommodating portion 21 in the axial direction.

The force works on the connecting portions 29, which define the recessed grooves 24, to move the tubular portion 23 toward the circuit-board accommodating portion 21 thereby to urge the contact portion 181 of the second fitting member 18 onto the regulating portion 171 of the first fitting member 17. Thus, the present configuration regulates movement of the fuel property sensor in the axial direction. The present embodiment also produces operation effects similar to those of the first to third embodiments.

Fifth Embodiment

Figure 10:
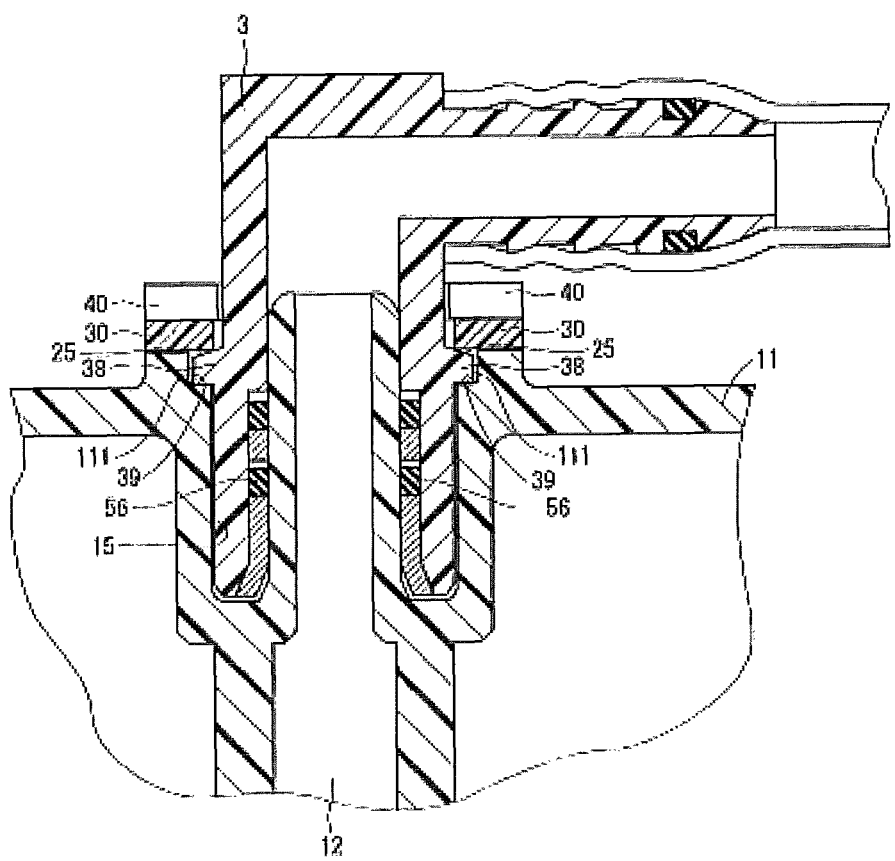
FIG. 10 is a sectional view showing the tubular-member mounting device according to the fifth embodiment.

The tubular-member mounting device according to the fifth embodiment will be described with reference to FIG. 10.

In the present embodiment, the tubular-member mounting device is applied to a fuel pipe 3. The fuel pipe 3 is coupled with an end of the fluid passage 12 of the flange 11. Fuel flowing through the fluid passage 12 is supplied to an internal combustion engine (not shown) through the fuel pipe 3. The end of the fluid passage 12 of the flange 11 has the insertion hole 15 inserted with the fuel pipe 3. An annular sealing member 56 such as an O-ring is equipped between the insertion hole 15 and the fuel pipe 3.

The fuel pipe 3 has the stopper portion 38 being in an annular shape and projecting radially outward. In the present embodiment, the fuel pipe 3 is equivalent to the tubular member. Further, in the present embodiment, the stopper portion 38 is equivalent to the large diameter portion, and the fuel pipe 3, which is located on the opposite side from the fluid passage 12 through the stopper portion 38, is equivalent to the small diameter portion. The wall surface of the stopper portion 38 on the opposite side from the fluid passage 12 has the inclined portion 25. The inclined portion 25 is inclined from the radially outside toward the radially inside in the axial direction from the fluid passage 12 to the circuit-board accommodating portion 21.

As follows, a method for mounting the fuel pipe 3 to the flange 11 will be described. First, the fuel pipe 3 is inserted into the insertion hole 15 of the flange 11. Subsequently, the clip 30 is inserted into the clip holding portion 40 in the direction perpendicular to the plane of FIG. 10. When the clip 30 urges the inclined portions 25 radially inward, force works on the inclined portions 25 to move the fuel pipe 3 toward the fluid passage 12. In the present state, the clip 30 receives the counter force from the inclined portions 25, and the counter force causes the end surface of the clip 30 on the opposite side from the fluid passage 12 to keep in contact with the end surface of the clip holding portion 40 on the side of the fluid passage 12 in the axial direction.

The force works on the inclined portion 25 to move the fuel pipe 3 toward the fluid passage 12 thereby to urge the stopper portion 38 onto the end surface of the flange 11 on the external-air side. Thus, the present configuration regulates movement of the fuel pipe 3 in the axial direction. In the present embodiment, an end surface 39 of the stopper portion 38 on the side of the fluid passage 12 is equivalent to the contact portion, and an end surface 111 of the flange 11 located on the side of the stopper portion 38 and urged with the stopper portion 38 is equivalent to the regulating portion. The present embodiment also produces operation effects similar to those of the first to fourth embodiments.

Other Embodiment

In the above embodiments, the angle θ of the inclined portion is set to satisfy 0<θ<45(°). It is noted that the angle θ of the inclined portion may be set in the range of 45≤θ(°). Also in the present configuration, the clip applies the force to the inclined portions radially inward thereby to urge the contact portion, which is formed on the tubular member, onto the regulating portion.

In the above first and second embodiments, the inclined portions 25 and 27 are formed on the tubular portion 23 respectively to define the recessed grooves 24. In addition, in the above third and fourth embodiments, the second inclined portions 34 and 35 are formed on the clip 30. It is noted that a configuration may be employed to form the inclined portions on the tubular portion to define the recessed grooves and to form the second inclined portions on the clip. In the present configuration, the second inclined portions of the clip respectively urge the inclined portions of the tubular portion defining the recessed groove.

In the above first and second embodiments, the inclined portions 25 and 27 are formed on the wall surface of the tubular portion 23 in the axial direction throughout from the radially outside toward the radially inside respectively to define the recessed grooves 24. In the above third and fourth embodiments, the second inclined portions 34 and 35 are formed on the wall surface of the clip 30 in the axial direction throughout from the radially outside toward the radially inside. It is noted that the inclined portions may be formed on the wall surface respectively to define the recessed grooves partially in the axial direction. In addition, the second inclined portions may be formed partially in the wall surface of the clip.

In the above-described multiple embodiments, the fuel property sensor is the concentration sensor to detect the ethanol concentration contained in fuel according to the electrical property between the electrodes. It is noted that the above-described configurations may be applied to, for example, a sensor for detecting an oxidization deterioration state of fuel.

In the above-described multiple embodiments, the fuel property sensor detects the capacitance between the electrodes thereby to detect the property and the state of fuel according to the dielectric constant of fuel. It is noted that the fuel property sensor may detect the resistance between the electrodes thereby to detect the property and the state of fuel according to the conductivity of fuel.

Summarizing the above embodiments, the tubular-member mounting device includes the passage member, the tubular member, the inclined portion, the lock member, the holding portion, the contact portion, and the regulating portion. The passage member has the fluid passage configured to flow fluid therethrough and the insertion hole configured to communicate the fluid passage with the external-air side. The tubular member is in the tubular shape and has the large diameter portion and the small diameter portion. The small diameter portion is smaller than the large diameter portion in diameter. The tubular member has one end in the axial direction, and the one end of the tubular member is inserted in the fluid passage of the passage member through the insertion hole. The inclined portion is formed on the step between the large diameter portion of the tubular member and the small diameter portion of the tubular member. The inclined portion is inclined from the radially outside toward the radially inside in the axial direction from the large diameter portion toward the small diameter portion. The lock member on the external-air side of the passage member urges the inclined portion radially inward. The holding portion is formed on the outer wall of the passage member. The holding portion is located on the radially outside of the insertion hole of the passage member to hold the lock member. The contact portion is equipped to the outer wall of the tubular member in the axial direction. The regulating portion is urged from the contact portion to regulate movement of the tubular member in the axial direction when the lock member urges the inclined portion radially inward thereby to apply the force to the inclined portion to move the tubular member toward the large diameter portion in the axial direction.

The lock member applies the force to the inclined portion radially inward, and the force works on the inclined portion to move the tubular member toward the large diameter portion in the axial direction. With the present configuration, the contact portion equipped to the tubular member is urged onto the regulating portion. Thereby, the passage member and the tubular member can be restricted from moving rapidly relative to each other, even when vibration is transmitted to the passage member or the tubular member from the outside of the device. It is conceived to apply the tubular-member mounting device to a vehicular device such as a fuel property sensor and/or a fuel pipe. In such an application, abrasion or deformation can be restrained in a component such as an O-ring equipped between the wall of the tubular member and the passage member defining the insertion hole. In addition, a wiring component in a fuel property sensor can be restrained from causing disconnection due to vibration. Thus, vibration-proof property of the fuel property sensor can be enhanced.

The tubular member may have the recessed groove being recessed radially inward and fitted with the lock member. In this case, the inclined portion may be the wall defining the recessed groove on the fluid-passage side or on the external-air side in the axial direction. When the lock member urges the inclined portion radially inward, the lock member receives counter force from the inclined portion. In the present state, the wall surface, which is opposed in the axial direction to the inclined portion defining the recessed groove, restricts the lock member from deforming to the opposite side from the inclined portion in the axial direction. Therefore, the lock member is enabled to urge the inclined portion steadily.

The inclined portion may be in the tapered shape and may be located at each of the two positions being symmetrical across the axis of the tubular member. In this case, the lock member may be elastically deformable and may be in the U-shape having the two arm portions and the joint portion. In this case, the two arm portions may extend substantially in parallel with each other, and the joint portion may connect ends of the two arm portions. In this case, the two arm portions may be located at positions symmetric across the axis of the tubular member to urge the inclined portion radially inward. With the present configuration, the force working to move the tubular member toward the large diameter portion in the axial direction is substantially applied onto the inclined portions uniformly at the positions symmetric with each other in the radial direction of the tubular member. Therefore, the tubular portion can be restricted from being inclined relative to the axis of the insertion hole. Thus, the contact portion can be urged steadily onto the regulating portion.

The tubular member may have a portion located on the side of the large diameter portion in the axial direction and inserted in the fluid passage. In this case, the contact portion may be located on the outer wall surface of the tubular portion on the side of the holder portion in the axial direction. In this case, the regulating portion may be located on the outer wall surface of the holding portion on the side of the contact portion in the axial direction. With the present configuration, the regulating portion and the holding portion are integrally formed thereby to simplify the tubular-member mounting device.

The lock member may have the outer wall surface in the axial direction defining the second inclined portion inclined from the radially outside toward the radially inside in the axial direction from one side toward the other side. In this case, the step of the tubular member and the large diameter portion may have the connecting portion therebetween. Further, when the second inclined portion of the lock member urges one of the connecting portion and the inclined portion radially inward thereby to apply the force to the one of the connecting portion and the inclined portion to move the tubular member to one side in the axial direction, the contact portion urges the regulating portion to regulate movement of the tubular member. With the present configuration, the tubular member can be mounted securely to the insertion hole of the passage member.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A tubular-member mounting device comprising:
a passage member having a fluid passage configured to flow fluid therethrough and an insertion hole configured to communicate the fluid passage with an external-air side of the passage member;
a tubular member being in a tubular shape and having a large diameter portion and a small diameter portion, the small diameter portion being smaller than the large diameter portion in diameter, the tubular member having one end in an axial direction, the one end being inserted in the fluid passage through the insertion hole;
an inclined portion located on a step between the large diameter portion and the small diameter portion and inclined from a radially outside toward a radially inside in the axial direction from the large diameter portion toward the small diameter portion;
a lock member located on the external-air side of the passage member to urge the inclined portion radially inward;
a holding portion located on an outer wall of the passage member and located outside the insertion hole relative to a radial direction of the insertion hole to hold the lock member;
a contact portion located on an outer wall of the tubular member in the axial direction; and
a regulating portion configured to restrict movement of the tubular member in the axial direction, when the lock member urges the inclined portion radially inward thereby to apply a force to the inclined portion in the axial direction to cause the contact portion to urge the regulating portion in the axial direction, wherein
the inclined portion is in a tapered shape and located at each of two positions being symmetric across an axis of the tubular member,
the lock member is elastically deformable and is in a U-shape having two arm portions and a joint portion, each of the two arm portions defining an inner periphery, the two arm portions extending substantially in parallel with each other, and the joint portion connecting ends of the two arm portions,
the two arm portions are located at positions symmetric across the axis of the tubular member to urge the inclined portion radially inward, and
the inner periphery defines an edge, which is in contact with a tapered surface of the inclined portion.

2. The tubular-member mounting device according to claim 1, wherein
the tubular member has a recessed groove, which receives the lock member to be fitted with the lock member, and
the inclined portion is a wall defining the recessed groove.

3. The tubular-member mounting device according to claim 1, wherein
the one end of the tubular member inserted in the fluid passage is located on a side of the small diameter portion in the axial direction,
the contact portion located on the outer wall of the tubular member is located on a side of the holding portion, and
the regulating portion is located on an outer wall of the holding portion on a side of the contact portion.

4. The tubular-member mounting device according to claim 1, wherein
the lock member has an outer wall defining a second inclined portion inclined from a radially outside toward a radially inside in the axial direction from one side toward an other side,
the step of the tubular member and the large diameter portion have a connecting portion therebetween, and
the contact portion urges the regulating portion and regulates movement of the tubular member, when the second inclined portion of the lock member urges one of the connecting portion and the inclined portion radially inward thereby to apply force to the one of the connecting portion and the inclined portion.

* * * * *